United States Patent
Beck et al.

(10) Patent No.: US 10,422,436 B2
(45) Date of Patent: Sep. 24, 2019

(54) FLUID HOUSING

(71) Applicant: BUERKERT WERKE GMBH & CO KG, Ingelfingen (DE)

(72) Inventors: Klaus-Guenther Beck, Kuenzelsau (DE); Andreas Lung, Doerzbach (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 15/837,646

(22) Filed: Dec. 11, 2017

(65) Prior Publication Data

US 2018/0163885 A1  Jun. 14, 2018

(30) Foreign Application Priority Data

Dec. 14, 2016 (DE) .................. 10 2016 124 397

(51) Int. Cl.
*F16K 27/10* (2006.01)
*F16K 7/12* (2006.01)
*F16K 27/02* (2006.01)

(52) U.S. Cl.
CPC .............. *F16K 27/10* (2013.01); *F16K 7/126* (2013.01); *F16K 27/0236* (2013.01)

(58) Field of Classification Search
CPC .......... F16K 27/10; F16K 27/00; F16K 7/126; F16K 27/0236
USPC ......................................... 251/366–368, 331
See application file for complete search history.

(56) References Cited

U.S. PATENT DOCUMENTS

| | | | | |
|---|---|---|---|---|
| 1,596,114 A | * | 8/1926 | Murray .................... | F16L 58/08 251/368 |
| 1,771,187 A | * | 7/1930 | Murray, Jr. ............ | F16K 27/102 251/366 |
| 2,034,418 A | * | 3/1936 | Plant ...................... | F16K 27/105 251/359 |
| 2,227,542 A | * | 1/1941 | Grove .................... | F16K 27/102 251/362 |
| 2,347,676 A | * | 5/1944 | Eplett .................... | F16K 27/102 251/359 |
| 2,363,943 A | * | 11/1944 | Carlson ................. | F16K 27/102 251/359 |
| 2,616,164 A | | 5/1948 | Tiedemann | |
| 2,841,167 A | * | 7/1958 | Jacobson ................. | F16K 1/14 137/327 |
| 2,869,221 A | * | 1/1959 | Siepmann ............. | F16K 27/102 251/366 |
| 3,154,289 A | | 10/1964 | Boteler | |
| 3,251,122 A | | 5/1966 | Boteler | |

(Continued)

FOREIGN PATENT DOCUMENTS

DE  1450561 A  3/1969

OTHER PUBLICATIONS

DIN 32676, "Fittings for the food, chemical and pharmaceutical industries—Clamp connectors for stainless steel tubes—Weld-on type" (May 2009 Edition).

*Primary Examiner* — John Bastianelli

(74) *Attorney, Agent, or Firm* — McNees Wallace & Nurick LLC

(57) ABSTRACT

A fluid housing in the form of a valve or sensor housing has a plastically shaped outer housing body made of metal with a fluid inlet and a fluid outlet, which have protruding tubular ports. On the outer circumference of the ports clamping rings are seated, which are welded to the associated port without the port being welded through.

12 Claims, 6 Drawing Sheets

(56) References Cited

U.S. PATENT DOCUMENTS

| | | | | |
|---|---|---|---|---|
| 4,136,709 A | * | 1/1979 | Rogers | F16K 5/0657 |
| | | | | 116/208 |
| 4,801,125 A | * | 1/1989 | Kocher | F16K 27/102 |
| | | | | 219/121.13 |
| 2011/0186769 A1 | * | 8/2011 | Mizobe | H01F 7/081 |
| | | | | 251/368 |
| 2013/0341551 A1 | | 12/2013 | Beck et al. | |

\* cited by examiner

FLUID HOUSING

FIELD OF THE INVENTION

The invention relates to a fluid housing by defines fluid valve housings and fluid sensor housings. Fluid flows through the housing, wherein the fluid is controlled directly in the housing by a valve and the fluid is measured in the housing by a sensor in order to then be controlled at another point.

BACKGROUND

Such fluid housings can be made of cast material, of solid material which is milled, or of a forged part. The present invention, however, relates to fluid housings in which the so-called outer housing body is produced by plastic shaping of a metal pipe. The outer housing body is incorporated into a fluid conduit, usually a pipe conduit, wherein connecting to the remaining part of the conduit must be effected as quickly as possible and without tightness problems. For this purpose, the outer housing body has a fluid inlet and a fluid outlet. The fluid inlet and/or the fluid outlet each have a protruding, tubular port.

One kind of flange-mounting the fluid housing to the rest of the fluid conduit provides so-called clamp ports. These are circular ring-shaped flanges on the tubular port protruding radially and on the side facing away from the outer housing body and having a planar end face. On the side facing the outer housing body these flanges have a clamping surface extending obliquely to the outside towards the end face. In the case of a correspondingly formed flange on the side of the adjacent conduit the two end faces then oppose each other and are pressed against each other, possibly by interposition of a seal. The opposite clamping surfaces extend in the manner of a clamp which on tightening ensures that the end faces move towards each other. Usually, such flanges are produced in that they either are cast along with a cast housing and subsequently are machined, are fabricated from a base body (forged part, cast part or solid material) and/or in the case of a housing made by plastic shaping are produced separately and welded subsequently. In the latter case, the separately produced flanges have a cylindrical, axial tab which forms part of the port and which is welded to a port base at the outer housing body. Such fluid housings were found to be very advantageous in practice.

It is the object of the invention to further improve such fluid housing, above all to manufacture the same at lower cost.

SUMMARY

The invention provides a fluid housing, comprising a plastically deformed outer housing body made of metal which includes a fluid inlet and a fluid outlet, wherein the fluid inlet and/or the fluid outlet each has a protruding, tubular port, wherein on at least one port a clamping ring is pushed onto outer circumference of the port and is welded or soldered to the port, and wherein the clamping ring has a planar end face facing away from the outer housing body and a clamping surface facing the outer housing body and radially extending obliquely to the outside and towards the end face.

The fluid housing according to the invention has a clamping ring which in contrast to the prior art is laterally attached to the port base of the outer housing body. Rather, the clamping ring is pushed onto the port and then welded to the port. At the same time, centering of the clamping ring is achieved therewith.

Furthermore, the at least one port provided with the clamping ring can have a shoulder against which the clamping ring axially rests. An axial positioning of the clamping ring relative to the port also is achieved therewith. In addition, the accuracy of the outer circumference of the port in the region of the seating surface for the clamping ring can be increased by the shoulder which is produced by a machining treatment.

The clamping ring should be radially welded to the port in the region of the shoulder.

According to one embodiment, the complete port is an integral part of the outer housing body and hence is present already when shaping the outer housing body. Thus, the entire port is part of the originally present pipe, which is shaped to form the outer housing body when the base body is a pipe.

Another variant on the other hand provides that the port is formed in two parts, comprising a pipe protruding from the interior of the outer housing body, which forms a separate part on which the clamping ring is seated. Furthermore, the port comprises a tubular tab of the outer housing body. Thus, the port is composed of the tubular tab of the outer housing body and the separate pipe which protrudes from the interior of the outer housing body. The pipe protrudes axially to the outside with respect to the tab of the outer housing body, so that the clamping ring can sit on this protruding portion. The clamping ring axially rests against the tab of the outer housing body and is welded to the tab.

Preferably, the clamping ring additionally is welded to the pipe on its end face.

Both for valves and for sensors it is common practice that the fluid inlet and the fluid outlet are arranged on opposite sides of the outer housing body coaxially to each other, so that the fluid control device can be inserted into a linear portion of a conduit. In this case it is advantageous when the separate pipe extends through the outer housing body and also through the tubular tabs of the outer housing body provided on opposite sides and with respect to these tabs each axially protrudes to the outside. A clamping ring is arranged on each of these protruding end portions of the pipe.

The clamping ring is welded to the pipe on its end face or, more generally, the clamping ring is welded to the port on its end face.

Furthermore, the invention according to one embodiment provides that on its side facing the outer housing body the clamping ring has an axial tab. The tab can be cylindrical, conical or crowned. At this tab, the clamping ring is welded to the port. Since the clamping ring otherwise has a clamping surface radially facing steeply to the outside, the accessibility for welding is improved by the tab. With respect to the welding quality it also is advantageous when the portions welded to each other do not have a too large difference in diameter.

With regard to the available material to be heated it is advantageous when the axial, cylindrical tab of the clamping ring has a larger outside diameter than the adjacent port in the region of the contact surface. The larger outside diameter leads to the fact that additional material is available for welding. Thus, no sink marks can be obtained on welding, and the quality of the welding seam is improved. In addition, no additional material is required in this region.

The clamping ring should have an inside diameter larger than the outside diameter of the pipe in the region of the seat of the clamping ring.

The clamping ring preferably can be made of another material than at least the fluid-carrying portion of the port extending radially within the clamping ring. Preferably, the entire fluid-carrying region of the port is made of the same material, so that no portions with different materials and hence different electric potentials can get in contact with the fluid, which otherwise might lead to corrosion.

Preferably, the entire fluid-carrying contact region of the port to the fluid hence is completely made of one part. In this region, no welding seam is present. This has the advantage that deposits cannot form undesirably. Moreover, smooth surfaces without elevations or depressions can be cleaned very well. This fluid-carrying part either is an integral part of the outer housing body or is formed by the above-mentioned inserted pipe. This is important in particular in the field of the pharmaceutical, food or cosmetics industry, as here extremely high hygienic demands are placed on fluid control devices. The fluid-carrying wall part in particular is made of stainless steel.

The clamping ring, which can be made of another material than the fluid-carrying portion of the port, thus can be made of less expensive and lower-quality steel.

In the region of the transition from an end face of the clamping ring to the port a circumferential welding seam is provided, wherein the end faces of clamping ring and port are machined only after welding, preferably by turning.

Moreover, the end face as usual extends vertically to the axial direction of the port.

In the end face a circumferential sealing groove can also be present in the clamping ring. This sealing groove can likewise be machines after welding the clamping ring to the port, for example when turning the end face.

It is important that the welding seams for attaching the at least one clamping ring to the port do not extend up to the fluid-carrying interior of the port. In other words: The port must not be welded through completely, i.e. the welding seam does not extend to the inner surface of the tubular port. Previous housings had to be reground on the inside after the welding operation, in part even had to be manually polished on the inside. In addition, the microstructure is changed by the welding process with the consequence of an increased susceptibility to corrosion. This cannot happen in the embodiment of the invention.

Due to the fact that no welding seams for the attachment of the at least one clamping ring to the port are formed in the interior of the port, a high cylindricity advantageously is ensured, which likewise provides for a good cleanability.

In the region of the at least one clamping ring only the associated port should be fluid-carrying. The at least one clamping ring is, thus, distanced from the inner surface of the fluid-carrying defining the interior of the port. The wall defining the port is separating the inner surface from the clamping ring. The clamping ring does not axially protrude over the associated axial end of the port.

Laser welding has turned out as preferred welding technique, so that all welding seams between clamping ring and port are laser welding seams.

DETAILED DESCRIPTION

Figure 1:
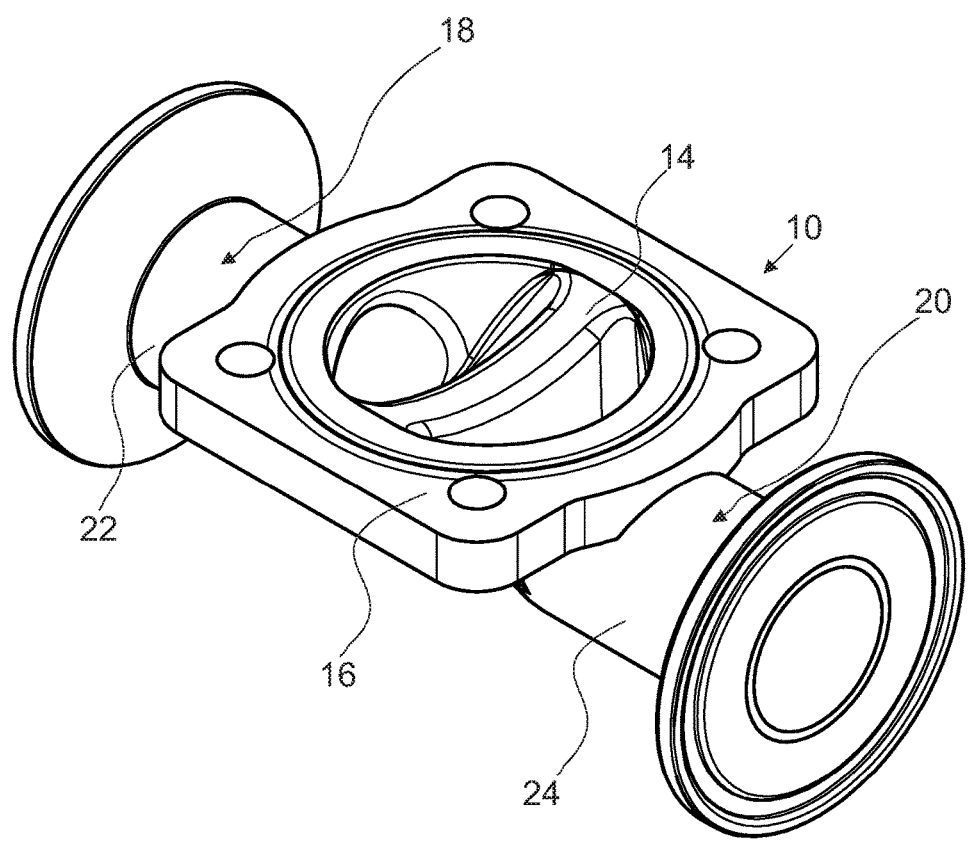
FIG. 1 shows a perspective view of a fluid housing in the form of a shaped pipe housing for a fluid valve.

FIG. 1 shows a lower part of a fluid housing 10 with an outer housing body. The fluid housing here is e.g. a valve housing which is made of a sectionally shaped pipe. The pipe here has been opened laterally before shaping and on the opposite side is provided with an indentation 12 which extends up to close to the opening provided on the opposite side, so as to here form an arc-shaped valve seat 14 (see FIG. 1) for a membrane. Onto the opening a ring-shaped flange plate 16 is welded, on which in turn a control unit with a drive for moving the membrane is mounted.

As can be seen in FIG. 1, the housing 10 hence has an inlet 18 and an outlet 20 extending coaxially thereto. As is usual in diaphragm valves, the fluid hence can flow through the inlet 18 to the flange plate 16, and when the membrane does not rest on the valve seat 14, the fluid can flow over the valve seat 14 to the outlet 20.

The inlet and the outlet each have a tubular port 22, 24, which is an integral part of the shaped pipe.

At the ends of the ports 22, 24 in the region of the outside, the ports 22, 24 are slightly turned off on the circumference, so that they have a smaller diameter. In this region, a clamping ring 26, 28 each is pushed onto the ports 22, 24.

Each clamping ring 26, 28 has an inside diameter which is minimally larger than the outside diameter of the respective port 22, 24.

Each clamping ring 26, 28 has an end face 30 facing the outside, the end face extending at right angles to the centric axis A of the ports 22, 24, as well as an opposite clamping surface 32 hence facing the outer housing body. The clamping surface extends radially obliquely to the outside towards the end face 30, so that the clamping ring conically tapers in a manner radially increasing to the outside.

In particular, the entire fluid-carrying portion of the outer housing body, i.e. the part which is formed by the shaped pipe, is made of the same material. The flange plate 16 is not in fluid contact and therefore can be made of a simpler, less expensive material. A part of the shaped pipe is beaded around the flange in order to prevent fluid contact with the flange plate 16. Furthermore, the two ports 22, 24 completely are made in one piece. Thus, the entire fluid-carrying inner wall region in the interior of the illustrated fluid control device housing is made of the same material, preferably stainless steel. In the region of the ports no welding seam or the like is provided in the fluid-carrying region on the inside.

Figure 2:
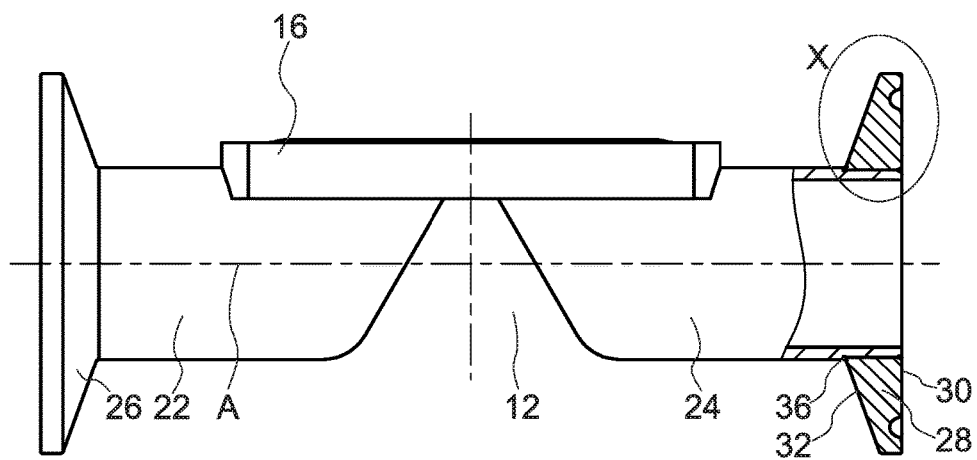
FIG. 2 shows a partial sectional view through the fluid housing according to FIG. 1.
Figure 3:
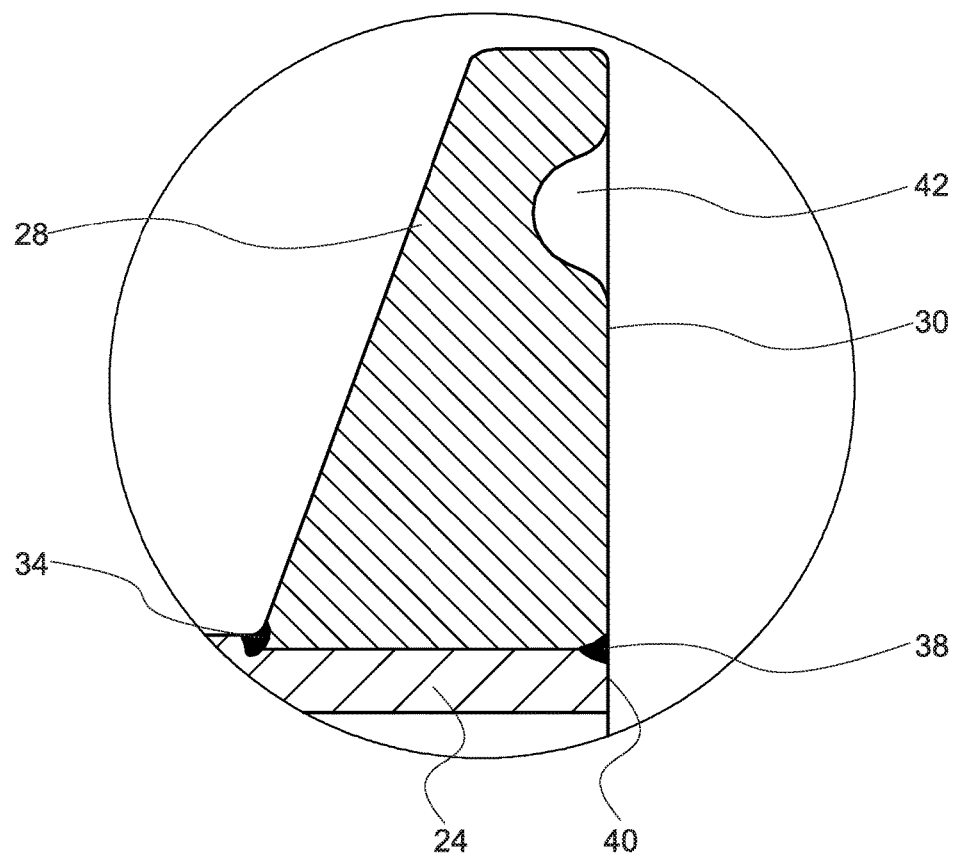
FIG. 3 shows an enlarged view of the region indicated with X in FIG. 2.

The clamping rings 26, 28 however are welded or soldered onto the ports 22, 24, which can be seen in FIGS. 2 and 3.

For welding in particular laser welding is used.

A first closed circumferential welding seam 34 is obtained between the shoulder 36 provided on the respective port 22, 24, against which the clamping ring 26 or 28 axially rests.

A second welding seam 38 is provided on the end face 30 at the transition of the clamping ring 26, 28 to the port 22, 24.

After welding at this point, the end face 30 is machined and receives its final design by the machining process, so that the welding seam 38 does not protrude with respect to the rest of the end face 30. The entire end face hence is formed by the end face 30 and by the end face 40 of the port 22 or 24 as well as by the welding seam 38 itself.

Figure 5:
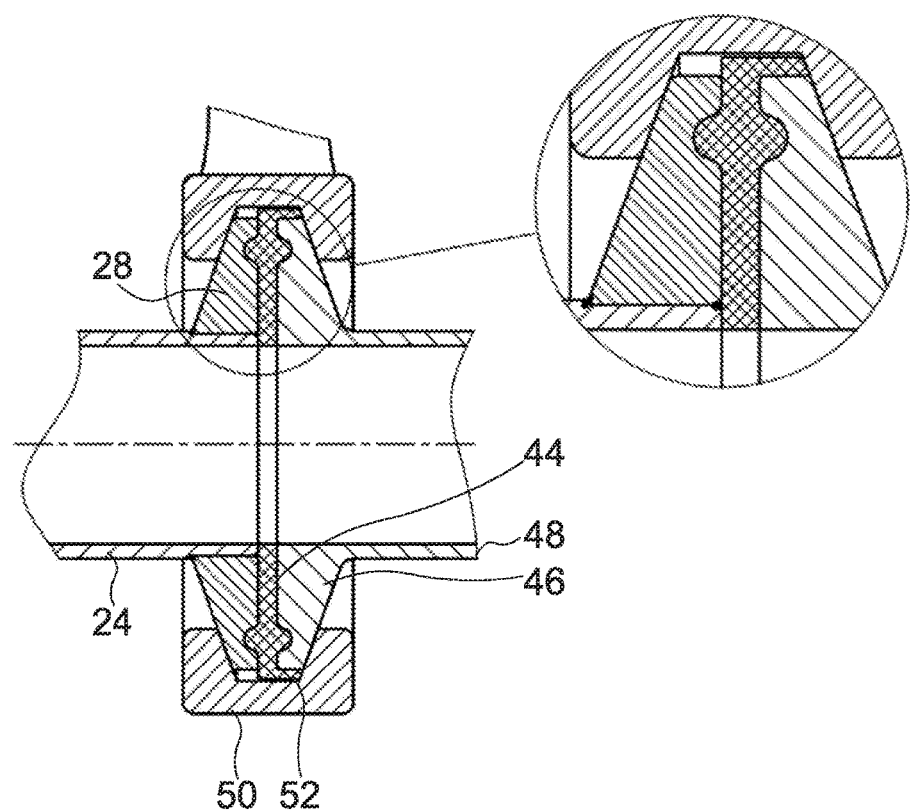
FIG. 5 shows a sectional view in the region of the connection of the fluid housing shown in FIG. 1 to the adjacent fluid conduit.

When producing the end face 30 by machining there is also produced a sealing groove 42 (see FIG. 3) into which a seal 44 protrudes (see FIG. 5).

Figure 4:
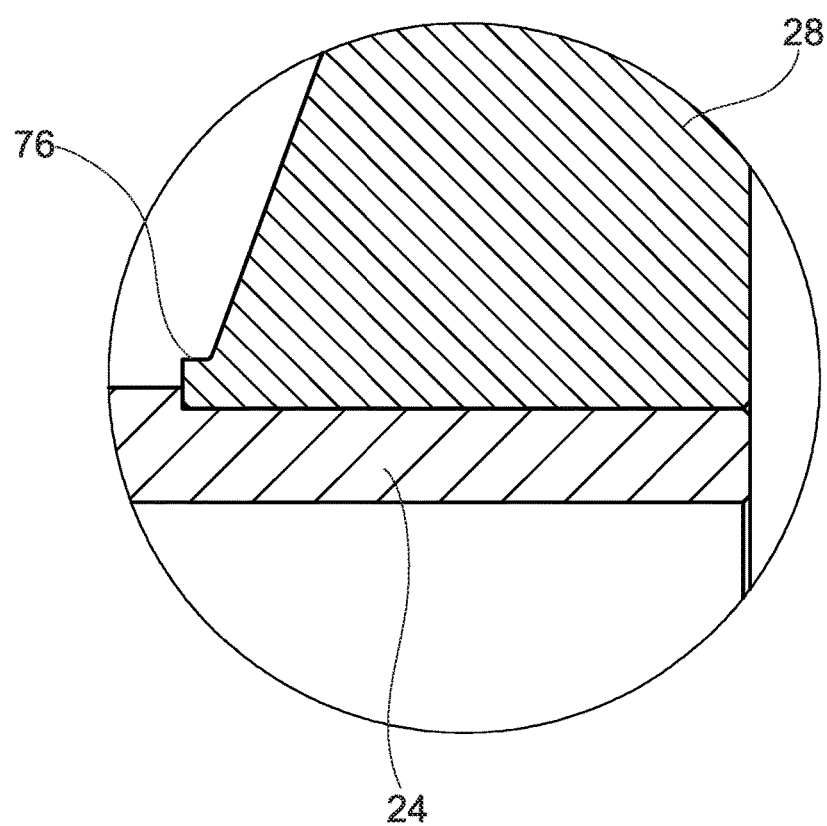
FIG. 4 shows a variant of the region indicated with X in FIG. 2.

In order not to produce any sink marks in the region of the welding seam 34, the tubular tab 76 can have a larger diameter than the port also in the region of the transition to the stop, as is shown in FIG. 4. Here, in contrast to FIG. 6, the tubular tab 76 is formed very short. In this region, additional material hence is available for the welding seam when the laser beam impinges on the material, so that no sink marks are produced. FIG. 4 shows the tab 76 before welding.

Due to the fact that the accessibility to the workpieces to be welded is very good, welding of the clamping ring is simplified.

FIG. 5 shows the clamping connection between the clamping ring 28 and a complementarily designed radial flange 46 of an adjacent fluid conduit 48.

A preferably multipart clamp 50 encloses flange 46 and clamping ring 28 and due to the wedge effect provides for axially pressing the two flanges against each other, wherein the interposed seal 44 is compressed. The seal 44 can have a radially outer, cylindrical tab 52 which rests on the radial circumferential surface of the flange 46 and/or the clamping ring 28 and is compressed between the same and the radial inside of the clamp 50.

It should be emphasized that in this embodiment and in the embodiment described below the welding seams 34, 38 never extend up to the radially inner, fluid-carrying wall region of the port 22, 24, which means that no through-welding is effected.

Figure 6:
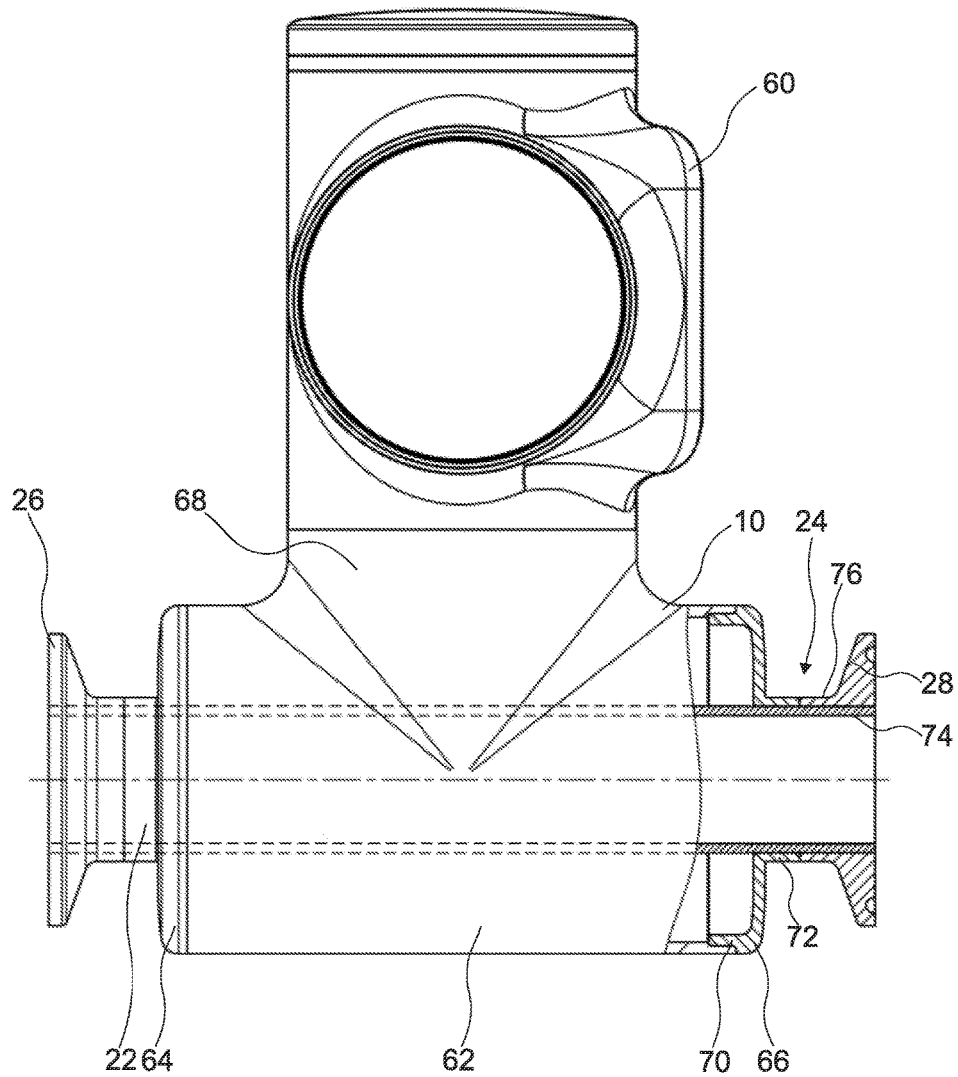
FIG. 6 shows a view of a second embodiment of a fluid housing according to the invention, here in the form of a fluid sensor housing.

The second embodiment of the invention shown in FIG. 6 shows a fluid control device housing 10 which is configured as fluid sensor housing and on which a so-called evaluation unit 60 with a display is laterally mounted. The sensor housing consists of several parts connected with each other, which in part are formed by shaping a tube, namely of a centric thicker housing part 62 to which a separate outer port 64, 66 each is attached and welded at its two opposite axial ends. The centric housing part 62 laterally has a bulge 68 with an opening in order to here connect the evaluation unit 60.

The outer ports 66 have an inner portion 70 which is adapted to the outside diameter of the openings in the centric housing part 62 and thereafter a portion 72 decreasing in diameter. The outer ports 66 also are referred to as tubular tabs of the outer housing body.

Beside the centric housing part 62 and the two outer ports 64, 66 the outer housing body in this embodiment also comprises a continuous pipe 74 which at both axial ends protrudes axially to the outside with respect to the portions 72 of the outer ports 66. On this protruding portion a clamping ring 26, 28 each is mounted.

Here, however, (which is not to be understood in a limiting sense) the clamping rings additionally have a tubular tab 76 which in its outside and inside diameter is adapted to the outside and inside diameter of the portion 72.

The tube 74 and the respective outer port 66 together form a multipart port 22, 24 to which the respective clamping ring 26, 28 is welded. In axial direction each clamping ring 26, 28 abuts against the end face of the associated outer port 66 and in this region is welded with a welding seam 34 (as also shown in FIG. 3). In addition, the clamping ring 26, 28 also is welded to the pipe 74 on its end face, so that a welding seam 38 as shown in FIG. 3 is obtained.

With respect to the orientation and machining of the end face 30 what has been said before applies. The shoulder in the port 22, 24 here is produced by the different diameters of the pipe 74 and the outer port 64, 66.

The material of the clamping ring 26, 28 is less expensive than that of the respective port 24, 26, i.e. also that of the pipe 74. Here, less expensive steel is used. As this material however does not get in flow connection with the fluid, there is no risk of a corrosion. Moreover, in the embodiment according to FIG. 6 the fluid-carrying part also is made in one piece, here of the pipe 74, so that after the manufacture no welding seams must be machined on the inside.

It applies for all embodiments that the clamping ring 26, 28 is not fluid-carrying on the inside, but that the guidance of fluid in this region is achieved by a one- or multipart portion of the port 24, 26. The clamping rings 26, 28 are distanced from the inner surface of the fluid-carrying defining the interior of the associated port 24, 26. The wall defining the port 24, 26 is separating the inner surface from the clamping ring 26, 28. The clamping rings do not axially protrude over the associated axial ends of the ports.

The invention claimed is:

1. A fluid housing, comprising an outer housing body made of metal manufactured from a pipe by plastic shaping, which includes a fluid inlet (18) and a fluid outlet (20), wherein the fluid inlet (18) and/or the fluid outlet (20) each has a protruding, tubular port (22, 24), wherein a clamping ring (26, 28) is pushed onto the outer circumference of at least one port (22, 24) and is welded or soldered to the port (22, 24), and wherein the clamping ring (26, 28) has a planar end face (30) facing away from the outer housing body and a clamping surface (32) facing the outer housing body and radially extending obliquely away from the outer housing body and in direction to the end face (30), and wherein an entire fluid-carrying contact region of the ports (22, 24) to the fluid is completely made of one part so that no welding seams are present, and wherein the at least one port (22, 24) provided with the clamping ring (26, 28) has a shoulder (36) against which the clamping ring (26, 28) axially rests, and wherein on the clamping ring's side facing the outer housing body the at least one clamping ring (26, 28) has an axial, tubular tab (76) which is welded to the port (22, 24) adjacent thereto and has a larger outside diameter than the adjacent port (22, 24).

2. The fluid housing according to claim 1, wherein the clamping ring (26, 28) is welded to the port (22, 24) in the region of the shoulder (36).

3. The fluid housing according to claim 1, wherein the port (22, 24) is an integral part of the outer housing body.

4. The fluid housing according to claim 1, wherein the at least one clamping ring (26, 28) is welded to the pipe (74) on the end face (30).

5. The fluid housing according to claim 1, wherein the at least one clamping ring (26, 28) is made of another metal than at least the fluid-carrying portion of the port (22, 24) extending radially within the clamping ring (26, 28).

6. The fluid housing according to claim 1, wherein in the region of the transition from the end face (30) of the clamping ring (26, 28) to the port (22, 24) a circumferential welding seam (38) is provided and the end face (30) of clamping ring (26, 28) and port (22, 24) is machined after welding.

7. The fluid housing according to claim 1, wherein on the end face (30) a circumferential sealing groove (42) is provided in the clamping ring (26, 28), the end face (30) being machined.

8. The fluid housing according to claim 1, wherein the welding seams (34, 38) for attaching the at least one clamping ring (26, 28) to the port (22, 24) do not extend up to the fluid-carrying interior of the port (22, 24).

9. The fluid housing according to claim 1, wherein the at least one clamping ring (22, 24) is distanced from the interior of the fluid-carrying interior of the port (22, 24) by the wall defining the port (22, 24).

10. The fluid housing according to claim 1, wherein the welding seams (34, 38) for attaching the at least one clamping ring (26, 28) to the port (22, 24) exclusively are laser welding seams.

11. A fluid housing, comprising an outer housing body made of metal manufactured from a pipe by plastic shaping, which includes a fluid inlet (18) and a fluid outlet (20) that are arranged coaxially to each other on opposite sides of the outer housing body, wherein the fluid inlet (18) and/or the fluid outlet (20) each has a protruding, tubular port (22, 24), wherein a clamping ring (26, 28) is pushed onto the outer circumference of at least one port (22, 24) and is welded or soldered to the port (22, 24), and wherein the clamping ring (26, 28) has a planar end face (30) facing away from the outer housing body and a clamping surface (32) facing the outer housing body and radially extending obliquely away from the outer housing body and in direction to the end face (30), and wherein the port (22, 24) is formed in two parts, comprising a pipe (74) protruding from the interior of the outer housing body, the clamping ring (26, 28) sitting on the pipe (74), and a portion (72) of the outer port (64, 66) of the outer housing body, which accommodates the pipe (74) and axially protrudes to the outside with respect to the pipe (74), and wherein the clamping ring (26, 28) rests against the portion (72) and is welded to the same, and, wherein the pipe (74) extends through the outer housing body and through the portions (72) on opposite sides in order to define the fluid inlet (18) and the fluid outlet (20), wherein the pipe (74) axially protrudes to the outside with respect to the portions (72), and wherein a clamping ring (26, 28) each is arranged on both pipe ends.

12. The fluid housing according to claim 11, wherein in the region of the at least one clamping ring (26, 28) only the associated port (22, 24) is fluid-carrying.

* * * * *